US012661670B2

(12) United States Patent
Yang et al.

(10) Patent No.: US 12,661,670 B2
(45) Date of Patent: Jun. 23, 2026

(54) SPRAY GUN

(71) Applicant: ZHEJIANG PRULDE ELECTRIC APPLIANCE CO., LTD., Jinhua City (CN)

(72) Inventors: Weiming Yang, Jinhua City (CN); Ting Han, Jinhua City (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 577 days.

(21) Appl. No.: 18/081,170

(22) Filed: Dec. 14, 2022

(65) Prior Publication Data

US 2023/0111371 A1 Apr. 13, 2023

Related U.S. Application Data

(63) Continuation-in-part of application No. 17/006,869, filed on Aug. 30, 2020, now abandoned.

(30) Foreign Application Priority Data

Aug. 30, 2019 (CN) ......................... 201910813887.9

(51) Int. Cl.
*B05B 7/24* (2006.01)
*B05B 7/12* (2006.01)

(52) U.S. Cl.
CPC .......... *B05B 7/2408* (2013.01); *B05B 7/1254* (2013.01); *B05B 7/2416* (2013.01); *B05B 7/2464* (2013.01); *B05B 7/2481* (2013.01)

(58) Field of Classification Search
CPC ... B05B 7/2408; B05B 7/1254; B05B 7/2416; B05B 7/2464; B05B 7/2481; B05B 9/0861; B05B 11/0044
USPC ...................... 239/302, 333; 222/380, 383.1
See application file for complete search history.

(56) References Cited

U.S. PATENT DOCUMENTS 3,768,734 A * 10/1973 Anderson, Jr. ....... B05B 11/106 222/341
2003/0042330 A1 3/2003 Streutker et al.
2006/0157589 A1* 7/2006 Joseph .................... B29C 51/08 239/11
2013/0105598 A1* 5/2013 Shultz ..................... B05B 9/043 383/105

(Continued)

FOREIGN PATENT DOCUMENTS

CN 103930218 A 7/2014
CN 206392292 U 8/2017

(Continued)

OTHER PUBLICATIONS

"Search Report of Europe Counterpart Application", issued on Feb. 8, 2021, p. 1-p. 8.

*Primary Examiner* — Kevin Edward Schwartz
(74) *Attorney, Agent, or Firm* — Oliff PLC

(57) ABSTRACT

A spray gun includes a casing, a cup, a spray nozzle, and a pump. The pump is provided in the casing and has a spray chamber in communication with the cup. The cup includes a cup housing and a flexible cup body provided in the cup housing. A venting structure communicating the cup with an outer environment is provided on the pump. The cup housing is provided with a hollow portion, such that the flexible cup body is manually squeezable to expel air inside the flexible cup body out via the venting structure.

7 Claims, 4 Drawing Sheets

(56) References Cited

U.S. PATENT DOCUMENTS

| | | | | |
|---|---|---|---|---|
| 2013/0256426 | A1* | 10/2013 | Becker | F04B 1/122<br>137/800 |
| 2018/0282000 | A1 | 10/2018 | Luczak | |

FOREIGN PATENT DOCUMENTS

| | | | |
|---|---|---|---|
| CN | 206404955 | U | 8/2017 |
| CN | 210935482 | U | 7/2020 |

* cited by examiner

SPRAY GUN

CROSS-REFERENCE TO RELATED APPLICATION

This application claims the priority benefit of China application serial no. 201910813887.9, filed on Aug. 30, 2019. The entirety of the above-mentioned patent application is hereby incorporated by reference herein and made a part of this specification.

BACKGROUND

Technical Field

The present disclosure relates to spray guns, and more particularly relate to a spray gun with efficient painting.

Description of Related Art

As an apparatus for atomizing coating, spray guns mainly serve to finish an object to be painted, thereby achieving an aesthetic, smooth and uniform coating. The spray guns mainly leverage the pressure inside a piston to reduce the space in a liquid container, and the increased air pressure forces out the liquid in the liquid container. As the motorized piston moves continuously, the pressure in the spray chamber rises expeditiously, thereby facilitating atomization of the liquid ejected out of the spray nozzle, and improving the coating effect.

An existing spray gun has a flexible and shrinkable liquid container. During use, as the liquid is forced out and decreases, the liquid container is shrunk and deflated, which guarantees complete ejection of the liquid, thereby avoiding waste and enhancing liquid utilization. However, this structure still has a problem, i.e., when air is present in the liquid container, the liquid cannot rise up into the spray chamber of the pump body to implement spray coating, which affects normal operation of the spray gun and lowers painting efficiency and operating efficiency.

SUMMARY

The present disclosure provides a spray gun with efficient painting.

The spray gun comprises a casing, a cup, a spray nozzle and a pump body. The pump body is provided in the casing and has a spray chamber in communication with the cup. The cup includes a cup housing and a flexible cup body provided in the cup housing. An air discharge structure communicating the cup with outside is provided on the pump body. The cup housing is provided with a hollow portion, such that the flexible cup body is manually squeezable to expel air inside the flexible cup body out via the air discharge structure.

The air discharge structure comprises an air outlet passage communicating with the cup and an air discharge passage communicating with the outside, the air discharge passage comprises an air discharge port, and the air discharge structure further comprises a closure cap adapted to open and close the air discharge port.

A relief valve port communicating with the spray chamber is provided on the pump body, the air outlet passage being communicating with the relief valve port, a relief valve assembly being provided at the relief valve port.

Further, the air discharge structure comprises an air outlet passage in communication with the cup and a air discharge passage in communication with the outside. The air discharge passage includes a air discharge port, and the air discharge structure further comprises a closure cap for covering and uncovering the air discharge port.

Further, a mounting base is provided in the air discharge port and is formed with a connection hole, and a sealing column inserted into the connection hole is provided on the closure cap.

Further, the closure cap is hinged to one side of the air discharge port.

Further, the air outlet passage and the air discharge passage are arranged in a "Γ" shape.

Further, a relief valve port in communication with the spray chamber is provided on the pump body, the air outlet passage is arranged to communicate with the relief valve port, and a relief valve assembly is disposed at the relief valve port.

Further, a charging port in communication with the cup is provided on the pump body. A charging screw-plug extending into the cup is connected at the charging port, and a filter mesh assembly is connected at a lower end of the charging screw-plug.

Further, the filter mesh assembly includes a filter cover and a filter disc. The filter cover is provided with a filter port, and the filter disc is disposed in the filter port.

Further, a fence surrounding the filter disc is provided on the filter cover to prevent the flexible cup body being squeezed from attaching to the filter disc.

Further, the fence is provided with a plurality of notches so as to partition the fence into a plurality of stop blocks.

With the above technical solutions, the present disclosure offers the following advantages.

1. In the present disclosure, a air discharge structure for communicating the cup with the outside is provided, and a hollow portion is provided in the cup housing. In this way, simply squeezing the hollow portion of the flexible cup body enables complete venting of the air present in the flexible cup body via the air discharge structure. With such configurations, the liquid in the flexible cup body easily enters the inside of the spray chamber, which enables the spray gun to coat stably at a high rate, thereby enhancing operating efficiency of the spray gun.

The air discharge structure comprises an air outlet passage communicating with the cup and an air discharge passage communicating with the outside; the air discharge passage comprises an air discharge port; the air discharge structure further comprises a closure cap opening and closing the air discharge port. With such configuration, the air in the flexible cup body may be smoothly delivered out via the air outlet passage and discharged via the air discharge passage, resulting in an orderly, stable air discharge; the closure cap is adaptable to open and close the air discharge port, wherein when air discharge is needed, the closure cap is opened, when air discharge ends, the closure cap is closed, which assures that during spraying, no liquid leaks out of the air discharge port, thereby ensuring normal operation of the spraying work.

A relief valve port communicating with the spray chamber is provided on the pump body, the air outlet passage is provided in communication with the relief valve port, and a relief valve assembly is provided at the relief valve port. With such configuration, pressure inside the cup may be relieved via the air outlet passage, thereby imparting a pressure relief functionality to the air outlet passage. That is, the air outlet passage has a dual functionality, which may eliminate an additional passage, thereby simplifying the pump body structure and easing pump body processing.

2. A mounting base is provided in the air discharge port, a connection hole is provided in the mounting base, and a sealing column inserted into the connection hole is provided on the closure cap. Such configurations guarantee that the closure cap is facilitated to cover and uncover the air discharge port with reliable sealing, preventing leakage of the liquid from the air discharge port during painting. Besides, such configurations facilitate operations on the closure cap, and the closure cap is opened or closed by a simple depressing or pulling action.

3. The closure cap is hinged to one side of the air discharge port, which not only facilitates the closure cap to cover and uncover the air discharge port, but also prevents missing of the closure cap after being opened, which offers convenience for subsequent use of the closure cap.

4. The air outlet passage and the air discharge passage are arranged in a "Γ" shape. The detoured venting path guarantees smooth venting of the air while preventing the liquid from leaking out of the air discharge port.

5. The pump body is provided with a charging port in communication with the cup. A charging screw-plug extending into the cup is connected with the charging port, and a filter mesh assembly is connected at a lower end of the screw-plug. Such configurations facilitate the liquid in the flexible cup body to enter the spray chamber. Besides, the filter mesh assembly enables filtering of the liquid so as to guarantee a finer and homogeneous spraying of the liquid.

6. The filter mesh assembly comprises a filter cover and a filter disc. The filter cover is provided with a filter port, and the filter disc is provided in the filter port. The filter mesh assembly of this structure not only facilitates the liquid to enter the charging screw-plug to guarantee liquid charging effect, but also guarantees liquid filtering effect. Besides, the simple structure is easy to manufacture and mold.

7. A fence surrounding the filter disc is provided on the filter cover to prevent the squeezed flexible cup body from attaching to the filter disc. With such configurations, the flexible cup body becomes gradually deflated during continuous painting, while the fence prevents the deflated flexible cup body from attaching to the filter disc and thus prevents blocking the liquid from entering the screw-plug. As such, normal liquid charging is guaranteed, and the liquid is able to be completely sprayed out, avoiding liquid waste.

8. A plurality of notches are provided on the fence to partition the fence into a plurality of stop blocks. This configuration not only saves the manufacturing material of the fence and thus reduces the manufacturing cost, but also prevents the deflated flexible cup body from attaching to the filter disc, thereby guaranteeing a normal liquid charging and then guaranteeing painting effect.

BRIEF DESCRIPTION OF THE DRAWINGS

Hereinafter, the present disclosure will be further illustrated with reference to the accompanying drawings.

REFERENCE NUMERALS

Figure 1:
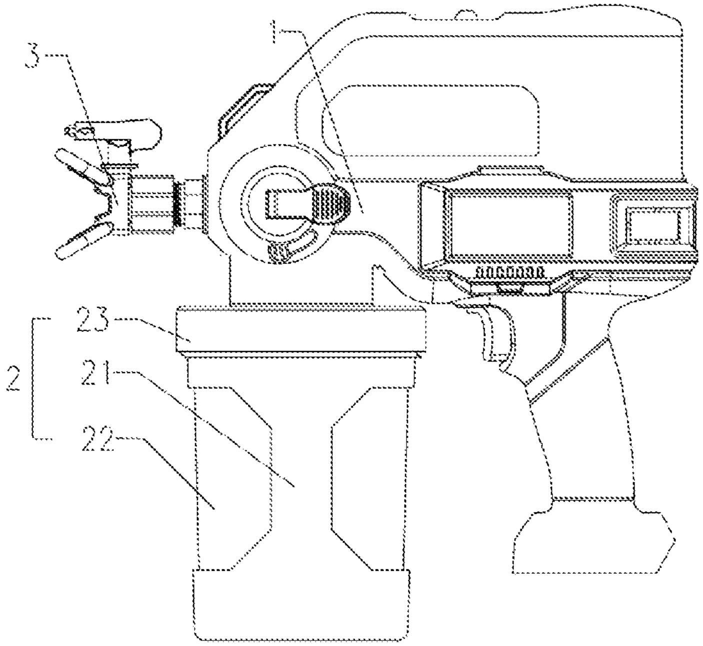
FIG. 1 is a structural schematic diagram of a spray gun according to the present disclosure.
Figure 2:
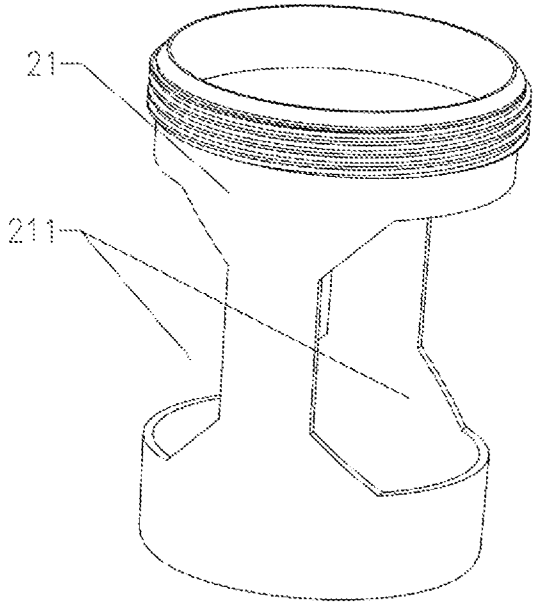
FIG. 2 is a structural schematic diagram of a cup housing in the spray gun according to the present disclosure.
Figure 3:
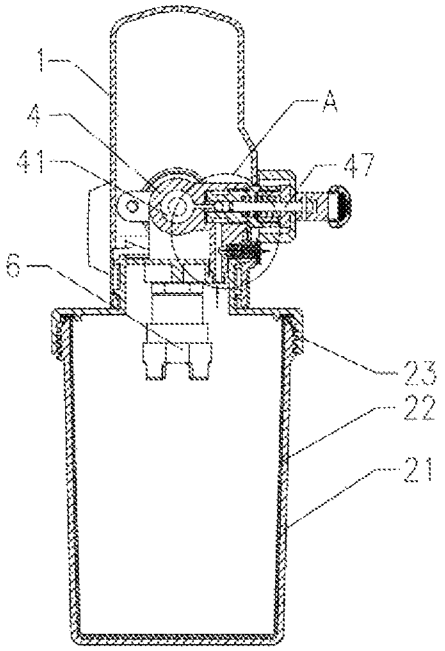
FIG. 3 is a sectional view of the spray gun according to the present disclosure.

1. Casing;

2. Cup; 21. Cup Housing; 211. Perforated Portion; 22. Flexible Cup Body; 23. Cup Lid;

3. Spray Nozzle;

4. Pump Body; 41. Spray Chamber; 42. Air Outlet Passage; 43. Air discharge passage; 431. Air discharge port; 44. Closure Cap; 441, Sealing Column; 45. Mounting Base; 451. Connection Hole; 46. Relief Valve Port; 47. Relief Valve Assembly; 471. Relief Valve Body; 4711—Valve casing; 4712—Locking Nut; 471*a*: Valve Cavity; 471*b*: Liquid Inlet; 471*c*: Liquid Outlet; 471*d*: Annular Groove; 472: Relief Valve Stem; 473: First Seal ring; 474: Second Seal ring; 475. Ball Element; 476. Spring; 477. Trigger; 48. Charging Port; 49. Liquid Inlet Passage;

5. Charging Screw-plug;

6. Filter Mesh Assembly; 61. Filter Cover; 611. Filter Port; 612. Fence; 613. Notch; 614: Stop Block; 62. Filter Disc.

Description of the Embodiments

Hereinafter, the present disclosure will be described in further detail through embodiments with reference to the accompanying drawings. It needs to be understood that the orientational or positional relationships indicated by the terms "upper," "lower," "left," "right," "longitudinal," "transverse," "inner," "outer," "vertical," "horizontal," "top," "bottom," etc. are only based on the drawings, intended only for facilitating or simplifying illustration of the present disclosure, not for indicating or implying that the devices/elements have to possess such specific orientations or have to be configured and operated with such specific orientations. Therefore, they should not be understood as limitations to the present disclosure.

As shown in FIG. 1 to FIG. 8, embodiments of the present disclosure provide a spray gun which includes a casing 1, a cup 2, a spray nozzle 3 and a pump body 4. The pump body 4 is provided in the casing 1 and has a spray chamber 41 in communication with the cup 2. The cup 2 includes a cup housing 21 and a flexible cup body 22 provided in the cup housing 21. Due to the flexibility, the flexible cup body 22 is deflated as the liquid therein decreases during continuous painting. In this way, the liquid in the flexible cup body 22 can be completely sprayed out, thereby avoiding waste and enhancing liquid utilization.

In this embodiment, am air discharge structure for communicating the cup 2 with the outside is provided on the pump body 4. A hollow portion 211 is provided in the cup housing 21. Configuration of the hollow portion 211 enables the flexible cup body 22 to be manually squeezable to expel the air in the flexible cup body 22 out via the air discharge structure. In other words, when there is air in the flexible cup body 22, the simple action of squeezing the hollow portion 211 of the flexible cup body 22 enables complete venting of the air therein. This facilitates the liquid in the flexible cup body 22 to enter the spray chamber 41, enabling the spray gun to perform painting quickly and stably, thereby enhancing painting efficiency and operating efficiency of the spray gun. Of course, in order to facilitate the user to squeeze the flexible cup body 22, two hollow portions 211 are optionally provided, respectively disposed at two opposite sides of the cup housing 21, such that one hand suffices to squeeze the flexible cup body 22 from the two sides, which offers a better squeezing effect and facilitates venting of the air inside the flexible cup body 22.

The air discharge structure includes an air outlet passage 42 in communication with the cup 2 and a air discharge passage 43 in communication with the outside. Of course, the air outlet passage 42 communicates with the air discharge passage 43 and is arranged integral therewith. The air discharge passage 43 comprises a air discharge port 431. The air discharge structure further comprises a closure cap 44 configured for covering and uncovering the air discharge port 431. The closure cap 44 enables the air in the flexible cup body 22 to be smoothly conveyed via the air outlet passage 42 and vented via the air discharge passage 43, thereby venting the air in an orderly and stable manner. The closure cap 44 is opened upon venting, and then closed upon completion of the venting. This ensures the liquid not to leak out from the air discharge port 431 during painting, thereby guaranteeing a normal painting operation.

To facilitate covering and uncovering of the air discharge port 431, a mounting base 45 is provided inside the air discharge port 431 and is formed with a connection hole 451. A sealing column 441 which is inserted into the connection hole 451 is provided on the closure cap 44. Such configurations ensure smooth covering and uncovering of the air discharge port 431, with a reliable sealing to prevent leakage of the liquid from the air discharge port 431 during painting. Besides, such configurations facilitating operations on the closure cap 44, i.e., a simple depressing or pulling action suffices to open and close the closure cap 44. Meanwhile, hingedly connecting the closure cap 44 to one side of the air discharge port 431 facilitates opening and closing of the closure cap 44. In an embodiment, a hinged hole is provided in the casing 1 corresponding to the air discharge port 431, while a hinged axle is provided on one end of the closure cap 44, such that fitting between the hinged axle and the hinged hole enables hinged connection of the closure cap 44, which not only facilitates the closure cap 44 to cover and uncover the air discharge port 431, but also prevents missing of the opened closure cap 44 and facilitates subsequent use of the closure cap 44.

Moreover, the air outlet passage 42 and the air discharge passage 43 are arranged in a "Γ" shape, i.e., the air outlet passage 42 is longitudinally disposed, while the air discharge passage 43 is transversely arranged, such that the detoured venting path guarantees smooth venting of the air while preventing leakage of the liquid via the air discharge port 431.

To guarantee the relief valve effect of the spray gun and enhance its service life, a relief valve port 46, which communicates with the spray chamber 41, is optionally provided on the pump body 4, and the air outlet passage 42 is arranged to communicate with the relief valve port 46. A relief valve assembly 47 is provided at the relief valve port 46. With such configurations, the pressure inside the cup 2 is relieved via the air outlet passage 42. As such, the air outlet passage 42 further functions to relieve pressure. In other words, the air outlet passage 42 has dual functions, which saves one passage, thereby simplifying the structure of the pump body 4 and lowering the difficulty in manufacturing the pump body 4.

Figure 4:
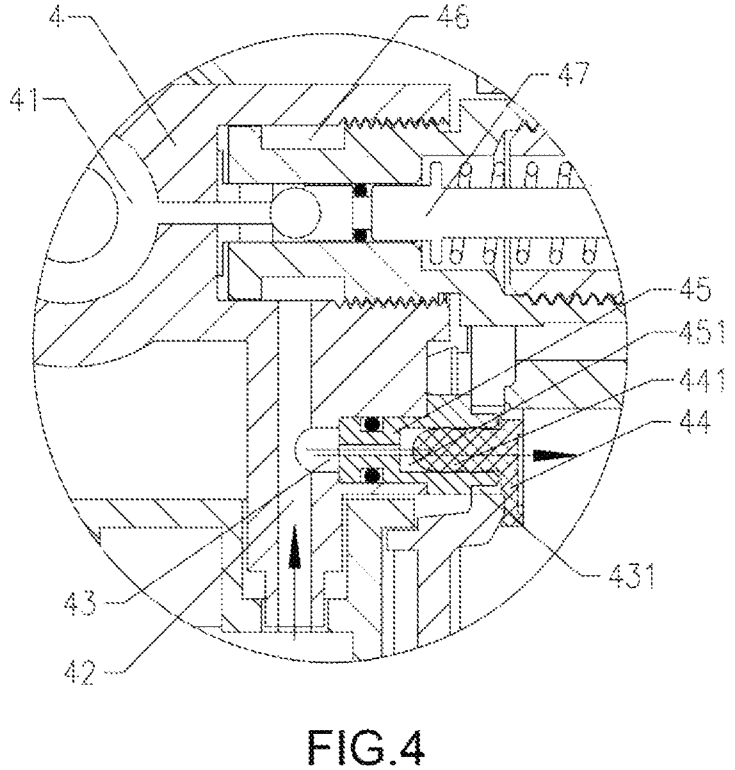
FIG. 4 is an enlarged view of region A in FIG. 3.
Figure 5:
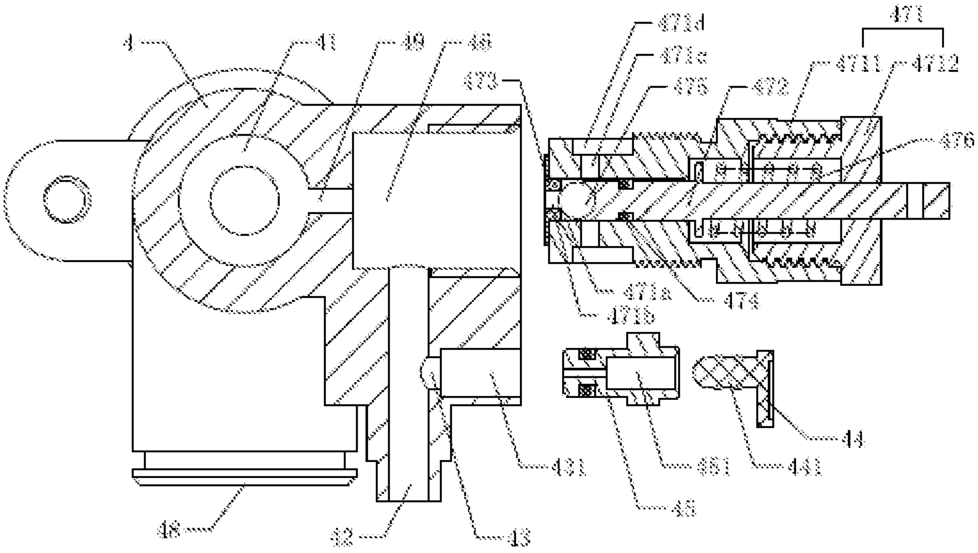
FIG. 5 is an exploded view showing a pump body, a relief valve assembly, a closure cap, and a mounting base in the spray gun according to the present disclosure.
Figure 6:
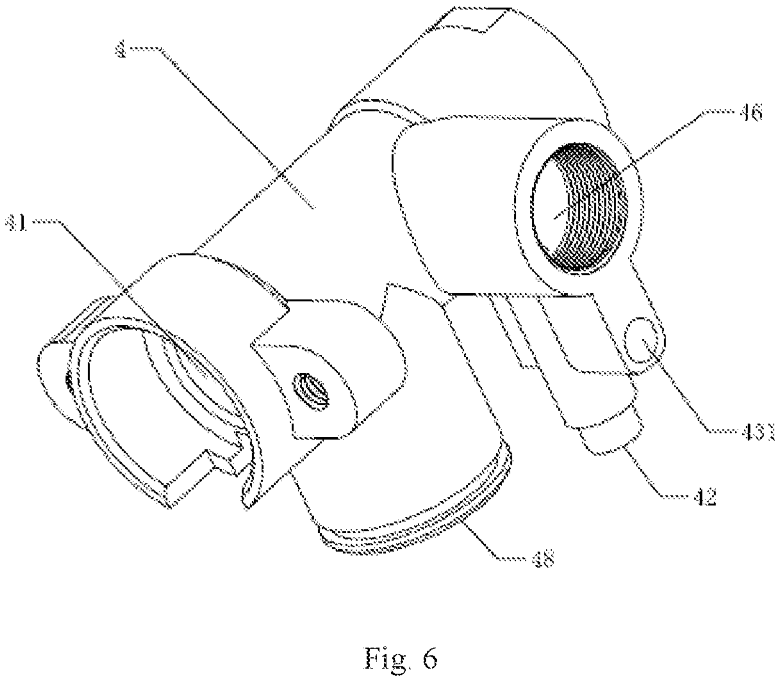
FIG. 6 is a structural diagram of a pump body in the spray gun according to the present disclosure.

Referring to FIG. 4, FIG. 5, and FIG. 6, the pump body 4 is provided with a liquid inlet passage 49 communicating with the spray chamber 41, the liquid inlet passage 49 and the air outlet passage 42 being both in communication at the relief valve port 46. The relieve valve assembly 47 comprises a relief valve body 471 and a relief valve stem 472, the relief valve body 471 being provided with a valve cavity 471*a*, the relief valve stem 472 being movable in the valve cavity 471*a* to control connection/disconnection between the liquid inlet passage 49 and the air outlet passage 42. In an implementation, the liquid inlet passage 49 is provided on a bottom wall of the relief valve port 46, the relief valve body 471 is provided with a liquid inlet 471*b* communicating with the liquid inlet passage 49 and the valve cavity 471*a*, at a peripheral side of the relief valve body 471 are provided with a liquid outlet 471*c* and an annular groove 471*d* which communicate with the valve cavity 471*a*, and the liquid outlet 471*c* is provided on a bottom wall of the annular groove 471*d*; a plurality of liquid outlets 471*c* are provided along the peripheral direction of the annular groove 471*d*; the annular groove 471*d* and an inner wall of the relief valve port 46 form a connection passage, the connection passage communicating with the liquid outlet 471*c* and the air outlet passage 42.

the relieve valve body 471 is provided with a first seal ring 473 at the liquid inlet 471*b*, the first seal ring 473 being closely attached to the bottom wall of the relief valve port 46; a second ring 474 is provided between the relief valve stem 472, the second seal ring 474 being disposed rear to the liquid outlet 471*c*. A ball element 475 is provided at a front end of the relief valve stem 472, the ball element 475 being adapted to abut on the first seal ring 473 to close the liquid inlet 471*b*.

The relief valve body 471 comprises a valve casing 4711 and a locking nut 4712, the valve casing 4711 being thread-fitted in the relief valve port 46, the locking nut 4712 and the valve casing 4711 being thread-fitted together to form the valve cavity 471*a*; the liquid inlet 471*b*, the liquid outlet 471*c*, and the annular groove 471*d* are all disposed on the valve casing 4711, a rear end of the relief valve stem 472 extending out of the locking nut 802 and being connected to a trigger 477. In the relief valve body 471 is provided a spring 476 sleeving over the relief valve stem 472, one end of the spring 476 abutting on the relief valve stem 472, and the opposite end of the spring 476 abutting on the locking nut 4712.

The spring 476 provides an elastic force for the relief valve stem 472 to tightly press against the liquid inlet 471*b*; under the action of the elastic force of the spring 476, the relief valve stem 472 drives the ball element 475 to abut on the first seal ring 473 to close the liquid inlet 471*b*, whereby to disconnect the liquid inlet passage 49 from the air outlet passage 42.

when the liquid pressure in the spray chamber 31 is excessive and needs relief, the liquid pressure in the liquid inlet passage 49 is greater than the elastic force of the spring 476 such that the liquid in the gas inlet passage 49 pushes the ball element 475 and the relief valve stem 472 to move in a direction away from the liquid inlet port 471*b*, whereby to open the liquid inlet port 471*b*. At this point, the liquid inlet passage 49 communicates with the air outlet passage 42 via the liquid inlet port 471*b*, the valve cavity 471*a*, the liquid outlet 471*c*, and the annular groove 471*d*, and the liquid in the spray chamber 31 flows back into the flexible cup body 22 via the liquid inlet passage 49, the liquid inlet port 471*b*, the valve cavity 471*a*, the liquid outlet port 471*c*, and the air outlet passage 42, thereby achieving relief. The liquid pressure in the spray chamber 31 decreases gradually with relief; when the elastic force of the spring 476 is greater than the liquid pressure in the liquid inlet passage 49, the spring 476 drives the relief valve stem 472 to push the ball element 475 to move towards the liquid inlet 471*b* such that the ball element 475 blocks the liquid inlet 471*b*, which assures liquid pressure in the spray chamber 31 and avoids an excessively low liquid pressure in the spray chamber 31 from affecting the spray coating effect of the misty liquid sprayed out of the spray nozzle 3. Opening and closing of the liquid inlet 471*b* are automatically controlled by the liquid pressure in the spray chamber 31, which assures that the liquid pressure in the spray chamber 31 maintains within an effective and safe extent.

Figure 7:
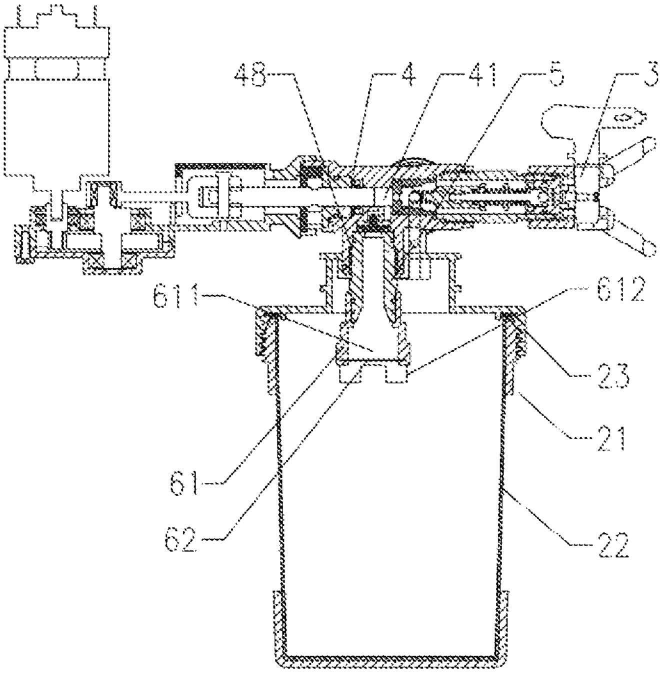
FIG. 7 is another sectional view of the spray gun according to the present disclosure.
Figure 8:
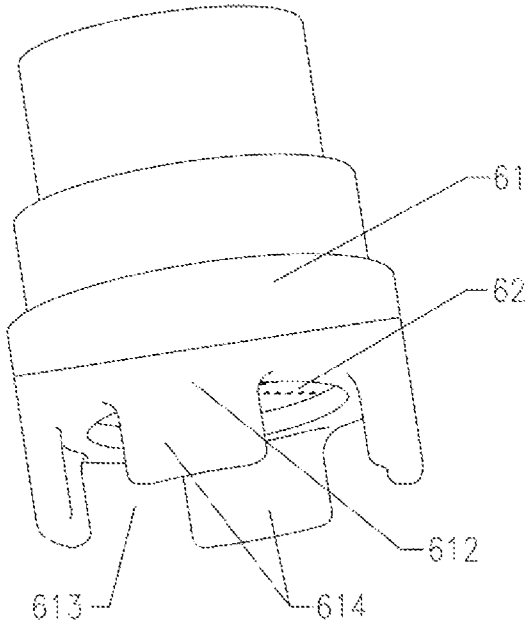
FIG. 8 is a structural schematic diagram of a filter assembly in the spray gun according to the present disclosure.

Referring to FIG. 7, a charging port 48 communicating with the cup 2 is provided on the pump body 4. The charging port 48 connects with a charging screw-plug 5 extending into the cup 2. The charging screw-plug 5 and the charging port 48 are securely thread-fitted. The lower end of the charging screw-plug 5 connects with a filter mesh assembly 6. The filter mesh assembly 6 and the charging screw-plug 5 are also securely screw-fitted, which facilitates the liquid in the flexible cup body 22 to enter the spray chamber 41. Besides, the filter mesh assembly 6 enables filtering of the liquid to guarantee a finer and homogeneous coating. Of course, to facilitate connection between the cup 2 and the charging port 48, a cup lid 23 is optionally provided on top of the cup housing 21, and a mounting countersink is provided in the cup lid 23. The charging port 48 is inserted into a mounting countersink and is securely fixed thereto by a snap-joint, thereby securely fixing the whole cup 2 to the charging port 48. To ensure sealing performance, a sealing gasket is optionally further provided between the inner sidewall of the mounting countersink and the outer sidewall of the charging port 48, while the cup lid 23 and the cup casing 21 are securely thread-fitted to tightly clamp the edges of the flexible cup body 22, thereby preventing disengagement of the flexible cup body 22.

In an embodiment, the filter mesh assembly 6 comprises a filter cover 61 and a filter disc 62. The filter cover 61 is provided with a filter port 611, and the filter disc 62 is provided in the filter port 611. The filter mesh assembly 6 of this structure not only guarantees the liquid to smoothly enter the charging screw-plug 5 to guarantee liquid charging effect and liquid filtering effect, but also facilitates manufacturing and molding.

To prevent the squeezed flexible cup body 22 from attaching to the filter disc 62 to block liquid spraying, a fence 612 is optionally provided on the filter cover 61 surrounding the filter disc 62. As such, when the flexible cup body 22 is gradually deflated during continuous painting, the fence 612 prevents the deflated flexible cup body 22 from attaching to the filter disc 62 and further blocks liquid from entering the charging screw-plug 5. In this way, normal liquid charging is guaranteed, and the liquid is enabled to be completely sprayed out, which avoids liquid waste.

To reduce the manufacturing materials and costs, a plurality of notches 613 are provided on the fence 612 to partition the fence 612 into a plurality of stop blocks 614. This configuration not only saves the processing materials of the fence 612 and thus reduces the processing costs, but also prevents the flexible cup body 22 from attaching to the filter disc 62 due to deflation of the flexible cup body, which guarantees normal liquid charging and thus guarantees painting effect of the spray gun.

Further, a coating mechanism for spraying liquid is a conventional technology, which is thus not detailed and recommended to refer to the Chinese patent application CN206404955U filed by same Applicant earlier. The structure as to the relief valve mechanism is also conventional, which also refers to the previously published patents such as CN206392292U, which will not be detailed here.

Besides the preferred embodiments above, the present disclosure also has other embodiments. Those skilled in the art may make various variations and alternations based on the present disclosure, and such variations and alterations should fall within the scope defined by the appended claims without departing from the spirit of the present disclosure.

What is claimed is:

1. A spray gun, comprising:

a casing;

a cup, including a cup housing and a flexible cup body that is provided in the cup housing;

a spray nozzle; and a pump body, provided in the casing, and having a spray chamber in communication with the cup, wherein an air discharge structure communicating the cup with an outside area is provided on the pump body, and the cup housing is provided with a hollow portion, such that the flexible cup body is manually squeezable to expel air inside the flexible cup body out via the air discharge structure;

the air discharge structure comprises an air outlet passage communicating with the cup and an air discharge passage communicating with the outside area, the air discharge passage comprises an air discharge port, and the air discharge structure further comprises a closure cap adapted to open and close the air discharge port; and a relief valve port communicating with the spray chamber is provided on the pump body, the air outlet passage communicating with the relief valve port, a relief valve assembly being provided at the relief valve port, wherein a largest dimension of the air outlet passage and a largest dimension of the air discharge passage extend transversely relative to each other such that the air outlet passage and the air discharge passage define an arrangement of an "T" shape.

2. The spray gun according to claim 1, wherein a mounting base is provided in the air discharge port and is formed with a connection hole, and a sealing column inserted into the connection hole is provided on the closure cap.

3. The spray gun according to claim 2, wherein the closure cap is hinged to one side of the air discharge port.

4. The spray gun according to claim 1, wherein a charging port in communication with the cup is provided on the pump body, a charging screw-plug extending into the cup is connected at the charging port, and a filter mesh assembly is connected at a lower end of the charging screw-plug.

5. The spray gun according to claim 4, wherein the filter mesh assembly includes a filter cover and a filter disc, the filter cover is provided with a filter port, and the filter disc is disposed in the filter port.

6. The spray gun according to claim 5, wherein a fence surrounding the filter disc is provided on the filter cover to prevent the flexible cup body from attaching to the filter disc when the flexible cup body is squeezed.

7. The spray gun according to claim 6, wherein the fence is provided with a plurality of notches so as to partition the fence into a plurality of stop blocks.

* * * * *